515,600

April 1, 1969 M. E. CAMPBELL 3,436,547

PATTERN RECOGNITION SYSTEM EMPLOYING TIME-SEQUENCE SIGNALS

Filed Dec. 22, 1965

INVENTOR.
MARK E. CAMPBELL
BY Sidney Magnes
AGENT

INVENTOR.
MARK E. CAMPBELL
BY Sidney Magnes
AGENT

INVENTOR.
MARK E. CAMPBELL
BY Sidney Magnes
AGENT

INVENTOR.
MARK E. CAMPBELL

BY Sidney Magnes
AGENT

INVENTOR.
MARK E. CAMPBELL
BY Sidney Magnes
AGENT

United States Patent Office 3,436,547

Patented Apr. 1, 1969

3,436,547

PATTERN RECOGNITION SYSTEM EMPLOYING TIME-SEQUENCE SIGNALS

Mark E. Campbell, Whittier, Calif., assignor to North American Rockwell Corporation, a corporation of Delaware Filed Dec. 22, 1965, Ser. No. 515,600

Int. Cl. G01j *1/20*

U.S. Cl. 250—203 9 Claims

ABSTRACT OF THE DISCLOSURE

This invention relates to apparatus and methods for recognizing a pattern, and for providing information about the pattern; and is more particularly presented in terms of providing information about a star-pattern that will indicate the orientation and attitude of a spacecraft. The disclosure teaches that certain "scans," such as a spiral, will convert the subject pattern to a pattern-signal having time-sequenced signals that are characteristic of that pattern; and that the resultant pattern-signal remains substantially constant if the spacecraft should roll. Various embodiments and forms of equipment for achieving the desired result are discussed.

BACKGROUND

It is well known that in a number of situations, such as space travel, it is extremely important—for purposes of navigation, maneuvering, observation, communication, etc.—to know the position of the space vehicle: the best source of this information being the stars. For example, at any given instant, a forward-looking line-of-sight will establish a field-of-view; and a group of stars observed in this field-of-view will appear as a pattern of pin-points of light. The attitude of the vehicle, as expressed in terms of the pitch and yaw angles of the vehicle, will determine which star pattern is observed; and the roll angle of the vehicle will determine the orientation of the star-pattern. In this way, the observed star-pattern and its orientation will provide information about the vehicle's position.

If the vehicle should now roll about its longitudinal axis, the star-pattern will be re-oriented, and will look entirely different—despite the fact that it is the same pattern, but has merely assumed a different relative orientation; whereas, if the vehicle changes its attitude, the initial star-pattern may be modified to contain new stars, while old stars may have disappeared. Thus, recognition of a star-pattern indicates the vehicle's attitude and orientation.

Rather than using a star-pattern, the vehicle's attitude and orientation may be obtained by recognizing the stars' characteristics (special color, variability, intensity, etc.). However, recognition of a star-pattern permits instant and continuous recognition over a long period of time.

To be useful, any star-pattern-recognition system must store information about the various star-patterns and possible modifications; and must compare the observed information with the stored information. Many prior-art pattern-recognition systems stored star-patterns in terms of the individual star's distances above or below, and to the right or the left of a given reference point, i.e., in terms of the star's "Cartesian coordinates." It will be realized that as the vehicle rolls, pitches, and/or yaws, each star of a given star-pattern changes its position relative to the reference point; and therefore an infinite number of coordinates have to be stored to define the many possible positions of each star of a single star-pattern. Since a pattern-recognition system would have to recognize numerous stars in numerous star-patterns, it is impracticable to store all the possible positions of the stars for each orientation of every star-pattern. The alternatives are (1) to use a tremendously large storage system, or (2) to store only a limited number of star-patterns. Each of these alternatives has its own disadvantages, so other systems were conceived.

Some of these other star-pattern-recognition systems stored star-pattern information in terms of the center-of-gravity ("centroid") of a three-star pattern. Other prior-art star-pattern-recognition systems stored star-pattern information in a still different manner, in that they recorded the angles between the stars and the vehicle. Still other prior-art pattern-recognition systems used still different approaches; but, as discussed above, the infinitely-large number of possible star-positions and star-patterns made these systems impracticable.

OBJECTS AND DRAWINGS

It is therefore an object of the present invention to provide an improved pattern-recognition system.

It is another object of the present invention to provide apparatus for converting a pattern into an electrical pattern-signal that remains recognizable despite changes in orientation, or minor modifications in the pattern.

It is a further object of the present invention to provide means for using these electrical signals to identify the pattern producing them, and to provide information about the orientation of the pattern.

It is still another object of the present invention to provide apparatus for finding a pattern that can be recognized.

These and other objects, together with many of the attending advantages of the invention, will be more readily understood from the teachings of the following specification, taken in conjunction with the drawings of which:

SYNOPSIS

Broadly speaking, the present invention analyzes a pattern by means of a special type of scan, such as a spiral; each interception of the scan with an element of the pattern producing a pulse-like signal. Due to the special type of scan, each pattern, regardless of its orientation, is represented by a given series of pulses that are separated by identifiable intervals of time. A computer, having a memory system that contains the time-intervals associated with various patterns, compares the incoming series of pulses with the stored information, to provide pattern-recognition and orientation information.

INTRODUCTION

For ease of comprehension, the explanation will first be presented in terms of a spot-pattern; and a later explanation will relate the spot-pattern to a star-pattern. Thus, in FIGURE 1 a group of spots—A through G—is scattered on a field to produce a spot-pattern. In order to analyze the spot-pattern, an "exploration-point" starts at a location known as the origin (identified by the + sign in the center of the field of view), and spirals outwardly with a constantly-increasing radius. Eventually the outwardly spiralling exploration-point intercepts the closest spot, A; the instant of interception occurring at a given time-interval after the spiral has been initiated.

As the exploration-point continues its outwardly spiralling movement, it intercepts spot B; the time-interval between the interceptions of spots A and B being fixed, and depending—other things being constant—on the locations of the spots. As the spiral continues to enlarge, the exploration-point intercepts the other spots, the instants of interception being fixed time-intervals from the instants of interception of previous and subsequent spots.

The outwardly spiralling of the exploration point may be designated as a "spiral-scan"; and if a graph is made of the instants that the exploration-point intercepts particular spots, a typical graph may appear as shown in FIGURE 2A, wherein the vertical lines indicate the instants at which the exploration-point intercepts the various spots. It should be noted that subsequent identical spirals started from the same origin-point will reproduce the same time-intervals shown in FIGURE 2A; that is, the time-intervals are "invariable." However, an identical spiral started from a different starting point would produce different, but invariable, time-intervals—since it would in all probability intercept the spots in a different sequence.

Figures 1, 2, 3:
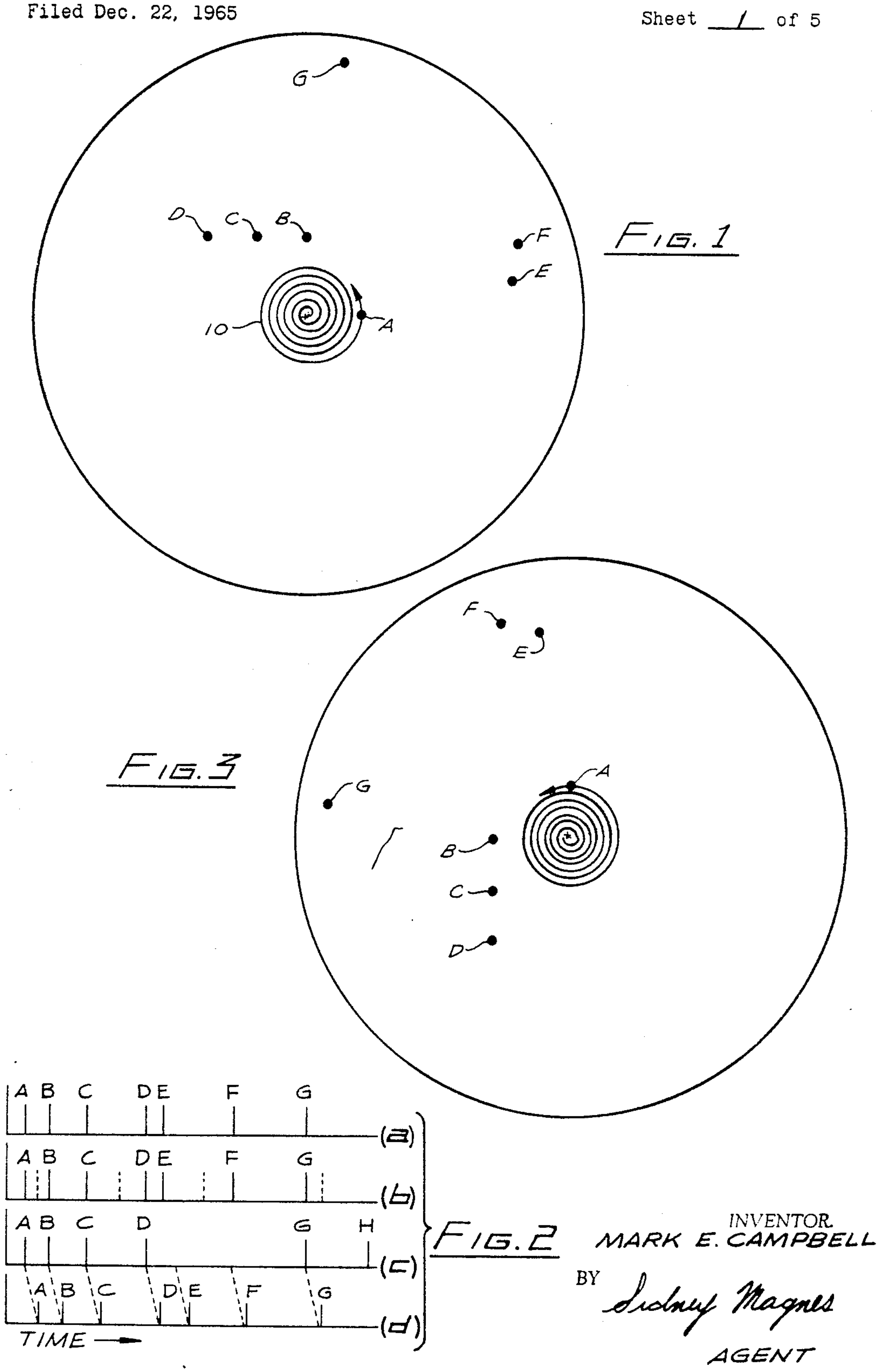
FIGURES 1 and 3 illustrate the way a spiral will intercept the spots of a pattern.
FIGURE 2 illustrates the time relation between interception of the spots.

Pattern modifications have the following effects, assuming the use of identical spirals starting at the same origin point. If spurious spots are encountered—as indicated by the dotted vertical-lines shown in FIGURE 2B—the time-relation between the original vertical lines A–G will still be the same. Moreover, if—as shown in FIGURE 2*c*—original spots such as E and F should disappear, and a new spot—such as H—should appear, the time-relation between the original spots would still be the same. Furthermore, if the spot-pattern of FIGURE 1 should rotate ninety degrees—as shown in FIGURE 3—FIGURE 2*d* shows that the exploration-point will intercept spot A at a slightly different time than previously, because the exploration-point would now have to travel an extra quarter of a revolution to intercept spot A; but from then on the time-relations between interception of spots A, B, C, etc., would be the same, although all would be slightly time-offset, as shown by the dotted lines interconnecting FIGURES 2*c* and 2*d*. It is thus obvious, that regardless of the orientation of the pattern, the time-relation between interception of given spots will be the same.

It should be noted that the spot-pattern A–G of FIGURES 1 and 3 is thus converted to a time-sequence pattern, shown in FIGURES 2*a*–2*d*, having invariable time-relations. If now, each interception of a spot produces a signal, the spiral-scan converts the spot-pattern into a time-sequence "pattern-signal"; the pattern-signal being characteristic of the spot-pattern, and being recognizable regardless of the orientation of the pattern, the presence of spurious spots, the absence of some spots, or the appearance of new spots.

The foregoing discussion has been presented in terms of a spot-pattern, but it is obvious that the spot-pattern could in actuality be a star-pattern as seen from a space vehicle. In this case, electronic "noise" could produce spurious spots; star G would disappear if the vehicle pitched downward; stars E and F would disappear and a new star H would appear if the vehicle yawed to the left; and the rotated star-pattern of FIGURE 3 would appear if the vehicle rolled one-quarter turn.

Figures 4, 5:
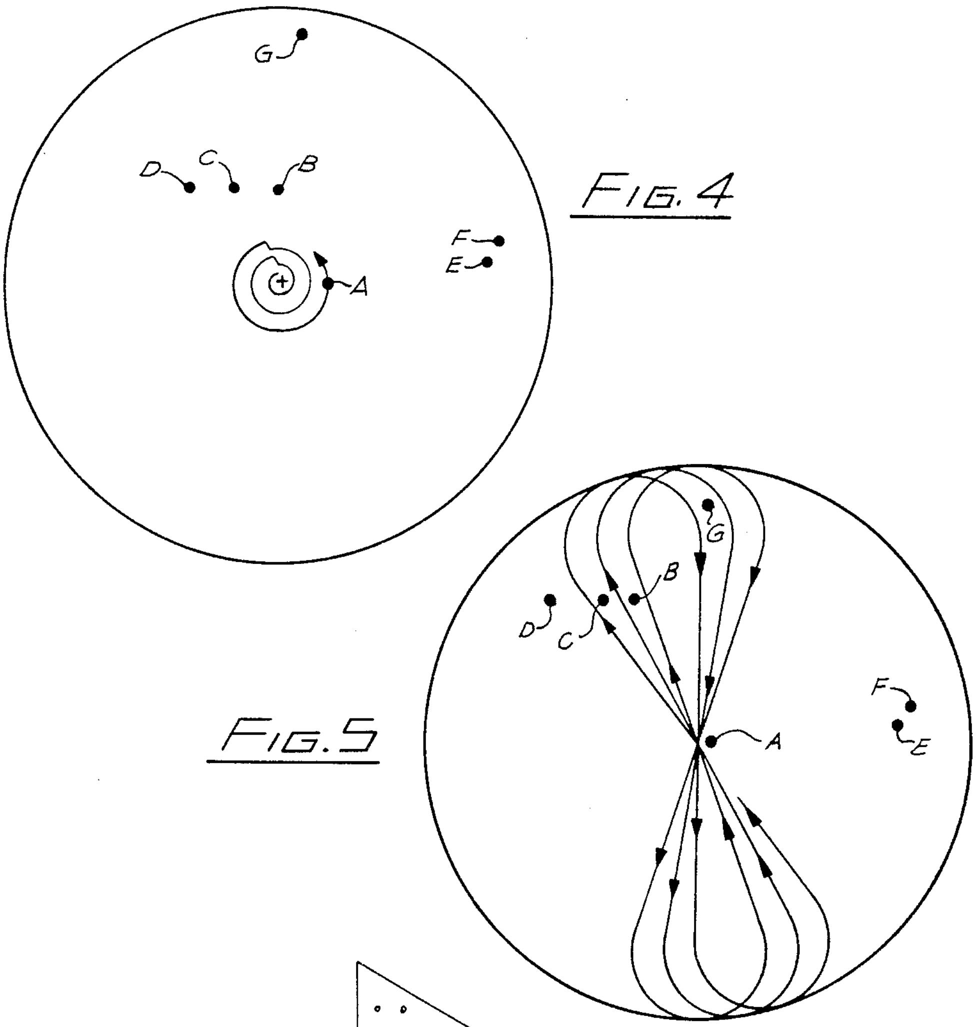
FIGURES 4 and 5 illustrate different ways of intercepting the spots of a pattern.

While the foregoing explanation has been given in terms of a spiral scan, other types of scans may be used. For example, FIGURE 4 shows a scan comprising a plurality of connected concentric circles; and an analysis of this scan's operation will reveal that it too converts a star-pattern into a time-sequence pattern-signal having invariable time-relations; and FIGURE 5 shows a rosette-type scan that converts a spot-pattern into a time-related pattern-signal.

It will be noted that these scans, and a number of others, circumscribe the viewed area; and exhibit a "circular symmetry" characteristic that converts a spot-pattern into a pattern-signal that retains its individuality regardless of orientation. Scans having this characteristic will therefore be designated "conversion scans," since they convert a pattern into a series of signals that are solely time-related; these time-related signals being free of synchronizing signals and the like, and being independent of pattern and/or vehicle orientation and attitude. It will be noted that these pattern-signals are characteristic of the pattern in a time-related manner, rather than in terms of coordinates, angles, centroids, or the like.

DESCRIPTION OF THE INVENTION

In the embodiment of the invention illustrated in FIGURE 6, the above concept is achieved as follows. An optical system 20 images a star-pattern 22 of a portion of the celestial sphere onto the photosensitive surface of a pickup-device 24—which may be a TV-type camera such as an image-orthicon or a vidicon, a storage-tube, or the like; these being some of the various types of cathode-ray-tube devices that receive light and convert the light into electrical signals.

PICKUP DEVICE

At this point, a slight digression is necessary in order to explain the operation of these pickup devices. In most cathode ray tubes of the above types, so-called deflection-signals are applied to the tube's deflection system to cause an electron beam to be deflected, the conventional deflection technique producing a series of parallel lines to form a scanning pattern known as a "raster." However, techniques are known for causing the electron beam to scan in other parallel lines. One of these techniques produces a spiral scan by means of the concept of Lissajous figures, wherein one deflection voltage in the form of a sine-wave is applied to the vertical deflection system of the cathode ray tube, while another deflection voltage in the form of a sine-wave is applied to the horizontal deflection system of the cathode ray tube. When these sine-waves are properly phased, and have suitable amplitudes, the electron beam acts as an exploration-point that will scan the tube's faceplate in such a manner as to form a circle. If now, the sine-waves are gradually increased in amplitude, the circle will slowly expand—thus producing a spiral scan of constant angular velocity. Moreover, the frequency of the sine-waves may be gradually decreased, so that the linear speed of the exploration-point will remain constant. Thus, a cathode ray tube of the above type can be caused to deflect its electron beam to produce an expanding, or—if desired—a contracting, spiral scan having either a constant or a controlled linear or angular speed.

Similarly, a concentric-circle scan of the type shown in FIGURE 4 may be produced by increasing the amplitude of suitably-phased sine waves in a step-like, rather than a gradual, manner. The lobe-like scan of FIGURE 5, and others, may be produced by well-known techniques.

Alternatively, the sequential positions of the electronic beam can be computed in advance, converted to deflection voltages, recorded on magnetic tape, and then applied to the deflection system. In any case, the desired conversion scans are readily available, and may be reproduced cyclically, or as required; being terminated and started by signals and techniques well known in the fields of radar, television, and oscillography.

Since—as explained above—cathode ray tubes of the above types use varying horizontal and vertical deflection signals to control the movement of the electron beam, a given set of horizontal and vertical "positioning" signals will position the electron beam so that the conversion-scan starts at the center of the pickup device, or at any desired location. Alternatively, the positioning signals may be magnetic fields that establish the scan-starting location; both the electrical and magnetic quiescent positioning techniques being well known and widely used in radar, oscilloscope, and television circuits. In any case, the conversion scan may be started at the origin, or at any desired point of the tube; and may then be shifted to any other desired location.

One further bit of information about the above types of cathode ray tubes is necessary. In most such tubes, when a star-pattern is imaged so that the light from the stars impinges onto the tube's photosensitive surface, the impinging light alters the electrical characteristics at the point of impingement. When the scanning electron beam sweeps across the points of light-impingement, the altered electrical characteristic of the photosensitive surface varies the electron beam; and the cathode ray tube produces output signals. Since the electron beam is moving swiftly, the output signal is of short duration, and is known as a "pulse"; and if the light is from a star, the output signal will be called a "star-pulse."

One further digression is necessary. It has been found that, for a practical system, the celestial-sphere should be divided into about fifty star-patterns, each of which would have many stars of different brightnesses. In order to optimize the system, it is desirable that each star-pattern should have about ten-to-fifteen bright stars; the relative locations of these selected stars corresponding to a distinctive star-pattern and a pattern-signal that can be readily recognized.

COUNTING SCAN

Figure 6:
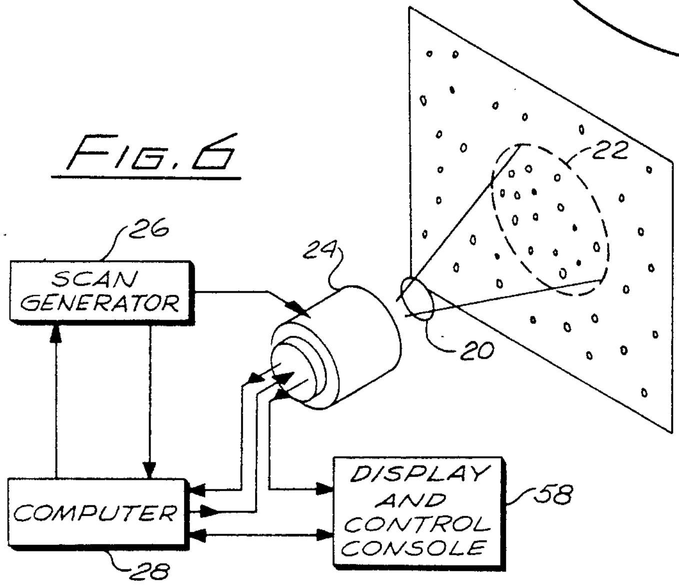
FIGURE 6 illustrates one embodiment of the invention.

Referring to FIGURE 6, reference-character 26 indicates a scan-generator, this generator using well-known circuitry, magnetic tape, computer program, or the like, for providing deflection signals of desired shape, frequency, phase, amplitude, etc. to cause the electron beam of pickup tube 24 to produce desired conversion-scan. As previously indicated, optical system 20 of FIGURE 6 images a portion of the celestial sphere, and the star-pattern 22 of that portion, onto pickup tube 24; and the apparatus, in the manner previously described, produces a conversion scan, to be designated as a "counting" scan for reasons to be explained later—each viewed star in the imaged portion of the celestial sphere producing a star pulse. The counting scan starts at an arbitrary origin point—indicated by the + sign of FIGURES 1, 3, and 4 —at the center of the field of view, this origin-point corresponding with the line-of-sight of the optical system. During the counting scan, suitable apparatus—to be discussed later—counts the number of star-pulses occurring during the counting scan; and, at the end of the counting scan, the number of viewed stars—as indicated by the count of star-pulses—is compared with the predetermined number of stars in the desired star-pattern.

Assume that the number of viewed stars is greater than the desired and predetermined number; thus indicating that the system's sensitivity is too high, and that too many faint stars are being viewed. In order to reduce the number of viewed stars, a gain-reducing signal is applied to the pickup tube, or some other appropriate part of the system. Sequential counting-scans and gain-reducing signals progressively reduce the star count to the desired number. If, on the other hand, the count is too low, a gain-increasing signal is produced.

In summary, repetitive counting-scans and gain-modifying signals assure that the viewed star-pattern comprises the desired number of stars.

SEARCH SCAN

It was previously indicated that a signal-pattern using the same scan-starting point was invariable; but unfortunately, the origin-point is an arbitrarily-chosen point that varies with the vehicle's attitude. As previously indicated, every scan-starting point will produce its own signal-pattern. To avoid this situation, and to produce an invariable signal-pattern for a given star-pattern, the same scan-starting point must always be used. To achieve this result, a "search" scan follows the satisfying count-matching count-scan, this search-scan searching for a repeatable starting point. This is achieved as follows. The search scan is again started at the origin-point; but as soon as the first star-image is intercepted, the resultant star-pulse is applied to computer 28. The computer thereupon causes scan generator 26 to shift the scan-starting-point from the origin-point to the first star image, which is a repeatable starting point for subsequent scans.

In order to shift the scan-starting point, the instantaneaus deflection voltages that resulted in deflecting the electron beam to the location of the first star-image are used as positioning signals to create the new starting-point at the location of the first star-image. One way to shift the starting point of the scan is to have the progressively-increasing deflection voltages applied to capacitors, whose instantaneous states thus correspond to the instantaneous location of the scanning electron beam; and to use the voltage on the capacitors as the positioning voltages that establish the location of the recognition-scan starting-point. The capacitors would, of course, be discharged at the end of each scan.

The first star intercepted by the search scan will be called the "base-star," since it now acts as a new base starting-point for a conversion-scan.

RECOGNITION SCAN

Figures 7, 8:
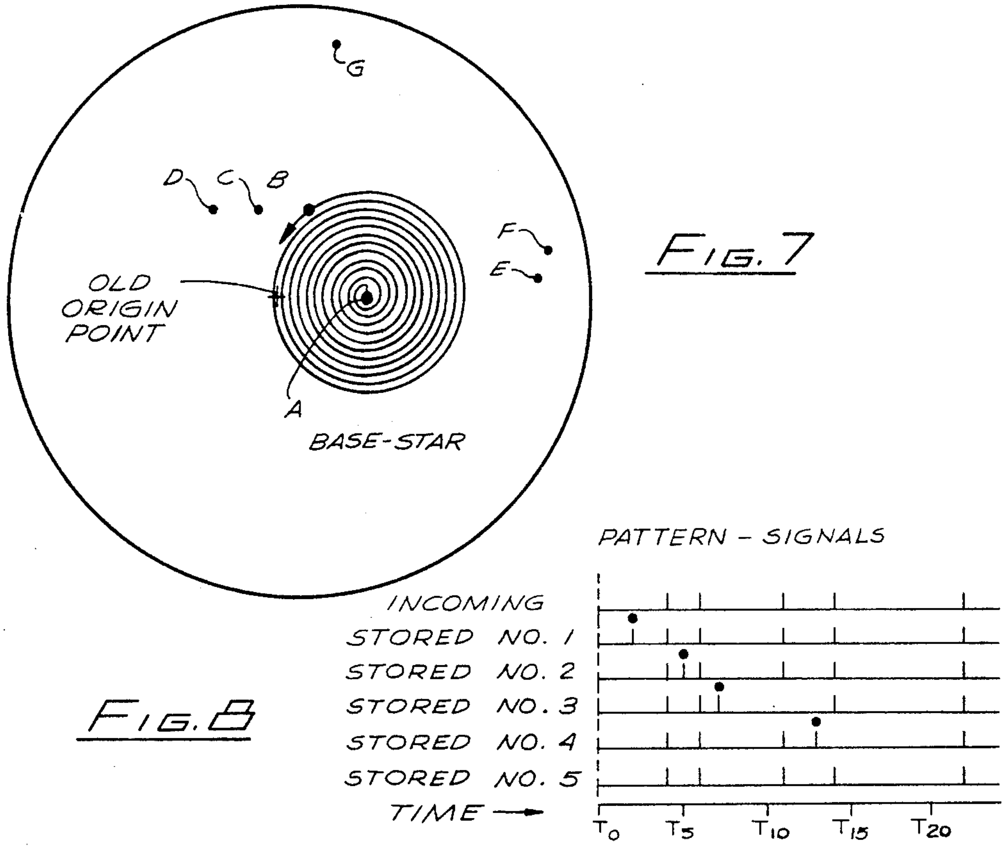
FIGURE 7 illustrates one portion of the operation of the invention.
FIGURE 8 illustrates the time-relation of various pattern-signals.

As shown in FIGURE 7, the starting-point for the next scan is shifted from the original origin point—as indicated by the + sign—to the base-star A; this scan being called a "recognition scan," since its purpose is to recognize the star pattern. As previously indicated, this recognition-scan also produces a timed series of star-pulses, i.e., a pattern-signal, that corresponds to a given star-pattern scanned by a conversion-scan starting at base-star A.

To recapitulate: a counting-scan establishes a star-pattern having the desired number of stars; a search-scan starts at the origin point, and locates a base-star; and a recognition-scan starts at the base star and produces a pattern-signal—relative to base-star A—that corresponds to the star-pattern. In this way the star-pattern is converted to a pattern-signal that is expressed in terms of time, and is independent of vehicle rotational orientation.

It will be realized from the preceding explanation, that the pattern-signal, relative to base-star A, will represent the given star-pattern regardless of its orientation. However, it is possible—depending upon the vehicle's attitude—that the resultant origin-point would produce a search-scan wherein some star other than star A could become the base star. Under this condition the recognition-scan based on this other star would produce a different pattern-signal for the same star-pattern. This means that if a star-pattern were to contain ten stars, each star could act as a base-star; and thus ten pattern-signals could be produced for the same star-pattern. Thus, this star-pattern would be represented by these ten pattern-signals; as compared with the numerous amount of information required by prior-art pattern-recognition systems.

When the equipment is operating aboard a space vehicle, where visibility is good, there is only a very remote possibility that a star will not produce a star-pulse; and, as indicated previously in connection with FIGURE 2C, the absence of a few star-pulses will not invalidate the pattern-signal. There is also a slight possibility that spurious star-pulses may be produced by faint stars not included in the star-pattern, or by inherent characteristics of the electronic circuitry; but as indicated in connection with FIGURE 2B, these spurious star-pulses will not invalidate the pattern-signal either.

Of course, it may happen that tne base-star-pulse was in actuality a spurious star-pulse caused by the electronic circuitry itself; and that the resultant pattern-signal is therefore useless. Alternatively, the pattern-signal might have been useless because in order to miniaturize the memory portion of the computer, no pattern-signal had been recorded for a recognition-scan using this particular base-star. Under either of these conditions, the incoming pattern-signal would not be recognized; and a second search scan is initiated, searching for a second base-star on which to base a recognition scan. At this time, the recognition-scan is based on the second, rather than the first, intercepted star, in order to avoid repeating the same unsatisfactory procedure.

STORED PATTERN-SIGNALS

It was previously indicated that the incoming pattern-signal is compared with a plurality of stored pattern-signals; and FIGURE 8 shows one way in which this may be done. In FIGURE 8, an incoming pattern-signal is shown—for simplicity—as comprising five star-pulses that occur at times identified as T4, T6, T11, T14, and T22; and this incoming pattern-signal is to be compared with a plurality (#1, #2, #3, #4, and #5) of stored pattern-signals. Again—for simplicity—only five stored pattern-signals are shown; only the last one (#5) corresponding to the incoming pattern-signal.

Figure 9:
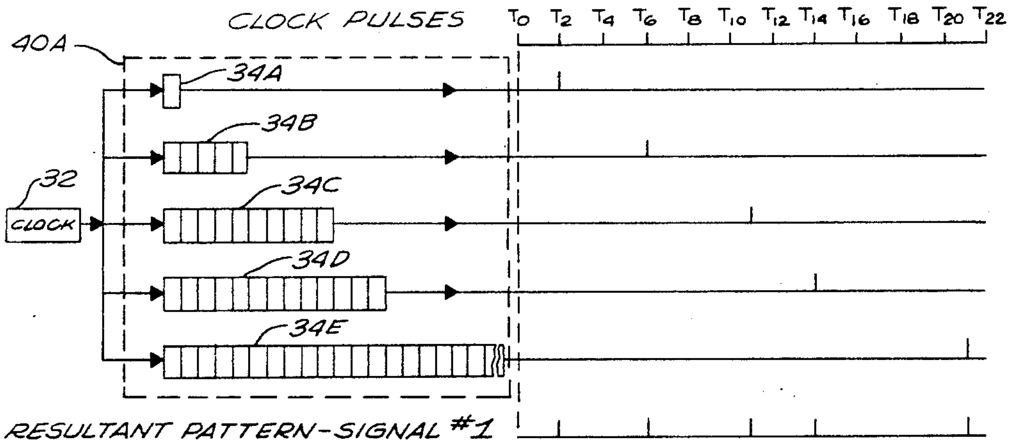
FIGURE 9 illustrates one means for storing a pattern signal.

The pattern-signals may be stored or produced in a number of ways, FIGURE 9 showing one way of doing this. Here, a clock-circuit 32 of the computer produces a series of uniformly-timed pulses, in a manner well known to those skilled in the art. These clock-pulses are applied simultaneously to a plurality of registers 34A, 34B, 34C, etc., each register being capable of accumulating its own individual number of clock-pulses, after which the register becomes overloaded, so that the next clock-pulse causes an overflow condition that produces an output pulse. Thus, of the plurality of registers shown in FIGURE 9, the first register 34A has a capacity of one pulse; and therefore the second clock-pulse produces an overflow that shows up as a first output pulse at time T2. The second register 34B has a capacity of five pulses, the sixth clock-pulse causing an overflow that shows up as the second pulse, which occurs at time 76. The third register 34C of FIGURE 9 has a capacity of ten pulses, the eleventh clock-pulse producing an overflow that produces the third pulse at time T11. In a similar manner, subsequent registers 34D and 34E have different capacities, so that they produce output pulses at times T14 and T22 respectively. By means well known to those skilled in the art, and therefore not illustrated, each output disables the input circuit of that register—as by setting a gating circuit such as an AND or a flip-flop circuit—so that the register does not produce any more output signals until the flip-flop is reset by a suitable signal.

The output pulses of the plurality of registers are combined, and appear as pattern-signal #1 shown in the bottom line of FIGURE 9; this pattern-signal representing a star-pattern that has star-pulses occurring at times T2, T6, T11, T14, and T22. The plurality of registers, 34A to 34E of FIGURE 9, thus acts as a storage-device 40A that stores the pattern-signal #1 of FIGURE 8. Other pluralities of registers, operating in the same manner, provide the stored pattern-signals #2, #3, #4, and #5 of FIGURE 8.

PATTERN RECOGNITION

Figure 10:
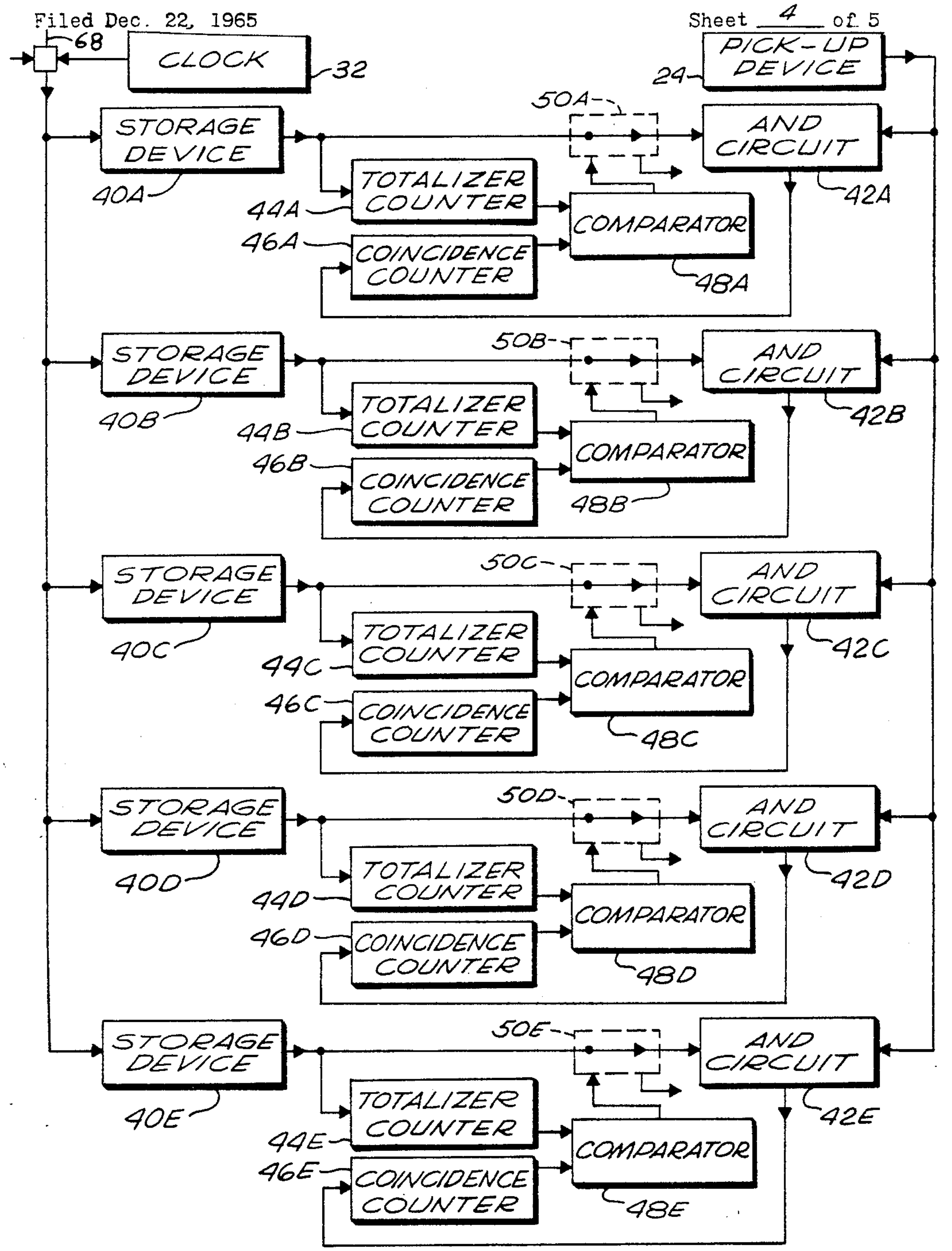
FIGURES 10 and 11 illustrate means for recognizing an incoming pattern-signal.

FIGURE 10 shows one way in which the computer may accomplish pattern recognition; this drawing illustrating means for comparing an incoming pattern-signal with a plurality of stored pattern-signals, and for performing other associated functions. Here, the various storage-devices 40A, 40B, 40C, etc., each represent groups of registers as discussed in connection with FIGURE 9; the various storage devices being capable of storing pattern-signals #1, #2, #4, and #5 of FIGURE 8.

The apparatus of FIGURE 10 is activated upon the receipt of a pulse from the base star detected by the pickup device, this pulse resetting the gating circuits so that the storage devices 40A–40E begin to produce their stored pattern-signals. Since the clock-pulses occur at an extremely rapid repetition rate, the base-star pulse will practically coincide time-wise with a clock-pulse—so that the stored pattern-signal and the incoming pattern-signal will both start at the same clock pulse. Under the influence of pulses applied to the various storage devices, 40A, 40B, 40C, etc., the first-channel storage device 40A produces its characteristic stored pattern-signal #1—pulses at times T2, T6, T11, T14, and T22—as previously discussed. The individual pulses of this pattern-signal are applied to two places; the first place being an AND circuit 42A, and the second place being a totalizer-counter 44A.

The totalizer-counter 44A operates as follows. Every time that an output pulse is produced by storage device 40A, totalizer-counter 44A increases its count by one. Thus, if storage device 40A produces one output pulse, totalizer-counter 44A indicates a count of one; and when storage device 40A produces a second output pulse, totalizer-counter 44A indicates a count of two. In this way, the totalizer-counter 44A indicates the total number of output-pulses produced by storage device 40A.

As indicated above, the pulses from storage device 40A are simultaneously applied to AND circuit 42A, which also receives the star-pulses from pickup device 24. An AND circuit is basically a coincidence circuit that produces an output signal only when two input signals are present simultaneously. Thus, each time that AND circuit 42A receives simultaneous pulses from storage device 40A and from pickup device 24, it produces an output signal; this output signal being applied to a coincidence-counter 46A.

The operation of the circuit as thus far described is as follows. At time T2, storage device 40A produces a first pulse—shown in pattern signal #1 of FIGURE 8—which causes the totalizer-counter 44A of FIGURE 10 to indicate a count of one. Since, at time T2, there has not been any star-pulse from pickup device 24—as shown in line one of FIGURE 8—AND circuit 42A of FIGURE 10 has not produced an output, and no signal has been applied to coincidence-counter 46A. At this time, then, the coincidence-counter 46A shows a count of zero, and the totalizer 44A shows a count of one. In other words, the comparison ratio of the first channel is zero/one; that is, zero coincidence for one pulse from the storage device. The lack of coincidence makes it probable that the pattern-signal stored in storage device 40A is not the same as the incoming pattern-signal. Therefore, a comparator 48A—which compares the instantaneous counts of totalizer-counter 44A and coincidence-counter 46A—recognizes the poor comparison ratio of channel A; and opens a switch 50A that disconnects storage device 40A from the circuit. This disconnection operation is indicated in FIGURE 8 by the dot over the first pulse of stored pattern-signal #1.

Turning our attention to the second channel B of FIGURE 10, at time T2 storage device 40B has not yet produced any pulse, as shown by pattern-signal #2 of FIGURE 8, so that its totalizer-counter 44B registers zero; and its coincidence counter 46B also registers zero. As a result, its comparison ratio is zero/zero. Its comparator 48B recognizes this as a satisfactory ratio, and permits switch 50B to remain closed; so that channel B is still operative.

For the same reason, namely a comparison ratio of zero/zero, channels C, D and E are also still in the circuit.

Since channel A is no longer operative, it may be ignored; and attention is directed to the remaining operative channels. At time T4, storage device 40B produces an output signal—shown in pattern-signal #2 of FIGURE 8—which is recorded in totalizer 44B, and is also applied to the AND circuit 42B. Since, as shown in line one of FIGURE 9, the incoming pattern-signal has a star-pulse at time T4, AND circuit 42B receives two simultaneous signals—one from storage-device 40B, and one from pickup device 24—and it therefore provides an output signal that is applied to coincidence-counter 46B. At this time, totalizer 44B has a count of one, and coincidence-counter 46B also has a count of one, for a comparison ratio of one/one. Comparator 48B recognizes the validity of this ratio, and maintains switch 50B in its closed condition.

It may be seen from FIGURE 8 that stored signal-patterns #3, #4, #5 of channels C, D, and E also produce stored pulses at time T4, all of which coincide with a star-pulse of the incoming pattern-signal. Therefore, for the same reason as given above, channels C, D and E also remain in the circuit.

At time T5, storage device 40B produces a pulse, as shown by pattern-signal #2 of FIGURE 8, but this pulse does not coincide with any star-pulse of the incoming pattern-signal shown in line one of FIGURE 8. Therefore, in accordance with the operation described above, totalizer 44B shows a count of two, and coincidence-counter 46B shows a coincidence of one; the comparison ratio at this time being one/two. Comparator 48B recognizes this as a poor ratio, and opens switch 50B; thus disconnecting channel B from operation; the dot in stored pattern #2 of FIGURE 8 indicating when channel B is disabled.

At this time only channels C, D, and E are still in operation.

At time T6, each of the storage devices 40C, 40D, and 40E produced a pulse, and so does the incoming pattern-signal—as indicated in FIGURE 8. The coincidence between the signals causes the individual AND circuits to increase the count in coincidence-counter 46C, 46D, and 46E; and the pulse from the storage devices cause the count to increase in totalizers 44C, 44D, and 44E. Therefore, each of channels C, D, and E now has a comparison ratio or two/two. Their respective comparators 48C, 48D, and 48E recognize the satisfactory ratio, and leave switches 50C, 50D, and 50E closed; so that channels C, D, and E remain in operation.

At time T7, storage device 40C produces a pulse, which, however, does not coincide with a pulse of the incoming pattern-signal. Therefore, at this time channel C has a comparison ratio of two/three. Its comparator 48C recognizes this as an unsatisfactory ratio, and disconnects channel C from operation; the vertical arrow associated with stored pattern-signal #3 in FIGURE 8 indicating the disabling of channel C.

At time T11, storage devices 40D and 40E produce pulses that coincide with a pulse of the incoming pattern-signal, so their comparison ratio at this time is three/three; their switches 50D and 50E remaining closed, permitting them to remain in operation.

At time T13, storage device 40D produces a pulse, which however does not coincide with an incoming star-pulse; so that its comparison ratio is now three/four. Its comparator 48D recognizes the poor ratio, and disconnects channel D from operation, as indicated by the dot of pattern-signal #4.

At time T14, storage device 40E produces a pulse that coincides with a pulse of the incoming pattern-signal, so its comparison ratio is now four/four, and its comparator 48E recognizes this ratio as satisfactory, and permits channel E to remain in operation.

At time T22, storage device 40E produces another pulse that is coincidence with the star-pulse of the incoming pattern-signal. At this time its comparison ratio is five/five. Its comparator 48E recognizes this as a satisfactory ratio, and maintains channel E in operation.

Since channel E is the only channel in operation, circuitry—such as a switch-position sensor—senses the state of switch 50E, and produces a signal referendum that causes the computer or any suitable display device to indicate that the pattern-signal stored in channel E corresponds with the incoming pattern-signal. Alternatively, the recognization signals may be obtained from the comparators, rather than from the switches.

In the above manner, an incoming pattern-signal is simultaneously compared with a plurality of stored pattern-signals; the recognition-operation being repeated cyclically, or as desired.

It will of course be realized that the actual circuit uses about ten-to-fifteen pulses for each pattern-signal rather than the five described above, and that there are fifty or more stored pattern-signals, rather than the five shown for explanatory purposes. Also, in actuality, the satisfactory comparison ratio may be set somewhat lower than the perfect ratio assumed above, in order to allow for the reception of pattern-signals that are modified by rolling, pitching, and yawing of the vehicle. This disclosed arrangement has the advantage of simplicity, and also provides a recognition signal as soon as all of the star-pulses have been received.

If, for some reason, more than one channel remains in operation at the end of the recognition operation, this would indicate that either the gain had changed to permit a faint star that was not part of the star-pattern to produce a star pulse, that a noise-pulse had inadvertently occurred in the stored pattern-signal portion of the circuitry at the exact instant than an incoming star-pulse arrived, or that a noise-pulse had occurred in the incoming pattern-signal portion of the circuitry at the exact instant that a pulse of the stored pattern-signal had been generated. Under these conditions, the recognition operation described above would be repeated. Alternatively, the incoming star-pulses of each scan may be continually counted by a star-pulse-counter and continually compared to the number of expected star pulses; and a gain-control adjusted accordingly. The recognition operation may then be repeated under this adjusted-gain condition.

Figure 11:
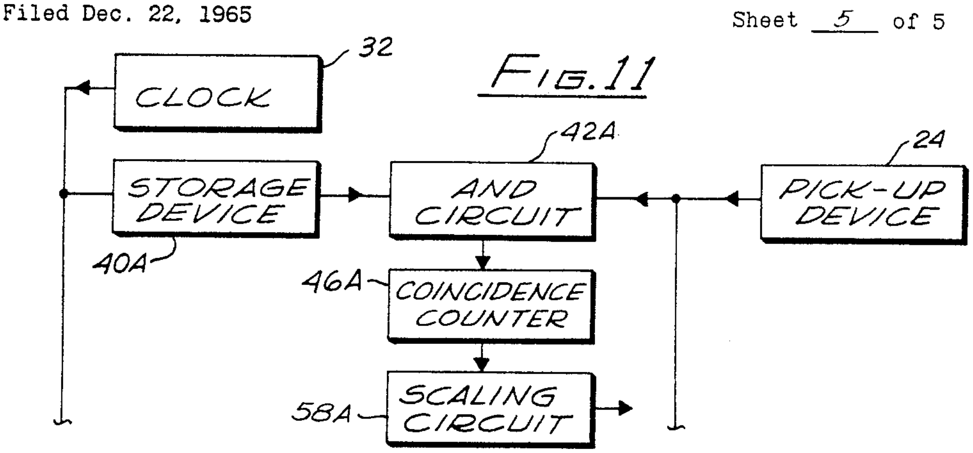

FIGURE 11 shows another way of recognizing the incoming pattern-signal; this drawing showing only one of the plurality of channels. The output of storage device 40A, previously described, is applied to AND circuit 42A, which also receives the output of the pickup device; and the coincidence-outputs of AND circuit 42A are fed to coincidence-counter 46A in the same manner as previously explained. In FIGURE 11, a scaling circuit 48A contains the total number of expected star-pulses; and divides the number of coincidences by the total number of expected star-pulses. In this way the scaling-circuit 58A provides the instantaneous comparison ratio for its channel. At the end of the recognition process, the computer may accept the highest comparison ratio, accept a comparison ratio only if it is over a given percentage, reject all the comparison ratios and perform another recognition search, shift the center of scan to a different base-star, etc.

ORIENTATION DETERMINATION

The above-described inventive concept has an additional advantage, namely, that of providing orientation information. Referring back to FIGURES 2A and 2D, it will be recalled that they were derived from FIGURES 1 and 3 respectively, the same star-pattern having been rotated ninety degrees. In FIGURES 2A and 2D, the resultant pattern-signals are the same, thus providing pattern recognition; but it will be noted that there is a different time-interval between initiation of the scan and the interception of the first star-image. This difference is caused by the angular relation between the starting-point of the scan and location of the first-star. Since the angular relation between the starting-point of the scan and the location of the first star is a function of the orientation of the space vehicle, the time-interval between initiation of the recognition scan and interception of the first-star is an indication of the vehicle's orientation. For example, if the first-star should happen to coincide with the starting-point, then obviously there would be a zero orientation-time-interval; and the computer would recognize that this zero orientation-time-interval indicates that the line-of-sight was directed toward the first-star. Any other orientation-time-interval would cause the computer to indicate another orientation, the specific orientation-time-interval indicating whether the first-star were to the right, to the left, up, or down; and how far. Furthermore, a changing orientation-time-interval would indicate that the vehicle was tumbling, rotating, vibrating, etc., and in what manner; so that remedial steps could be taken. Thus, the combination of a recognized star-pattern and the orientation time interval provides the attitude and orientation of the vehicle.

OPERATION

Figure 12:
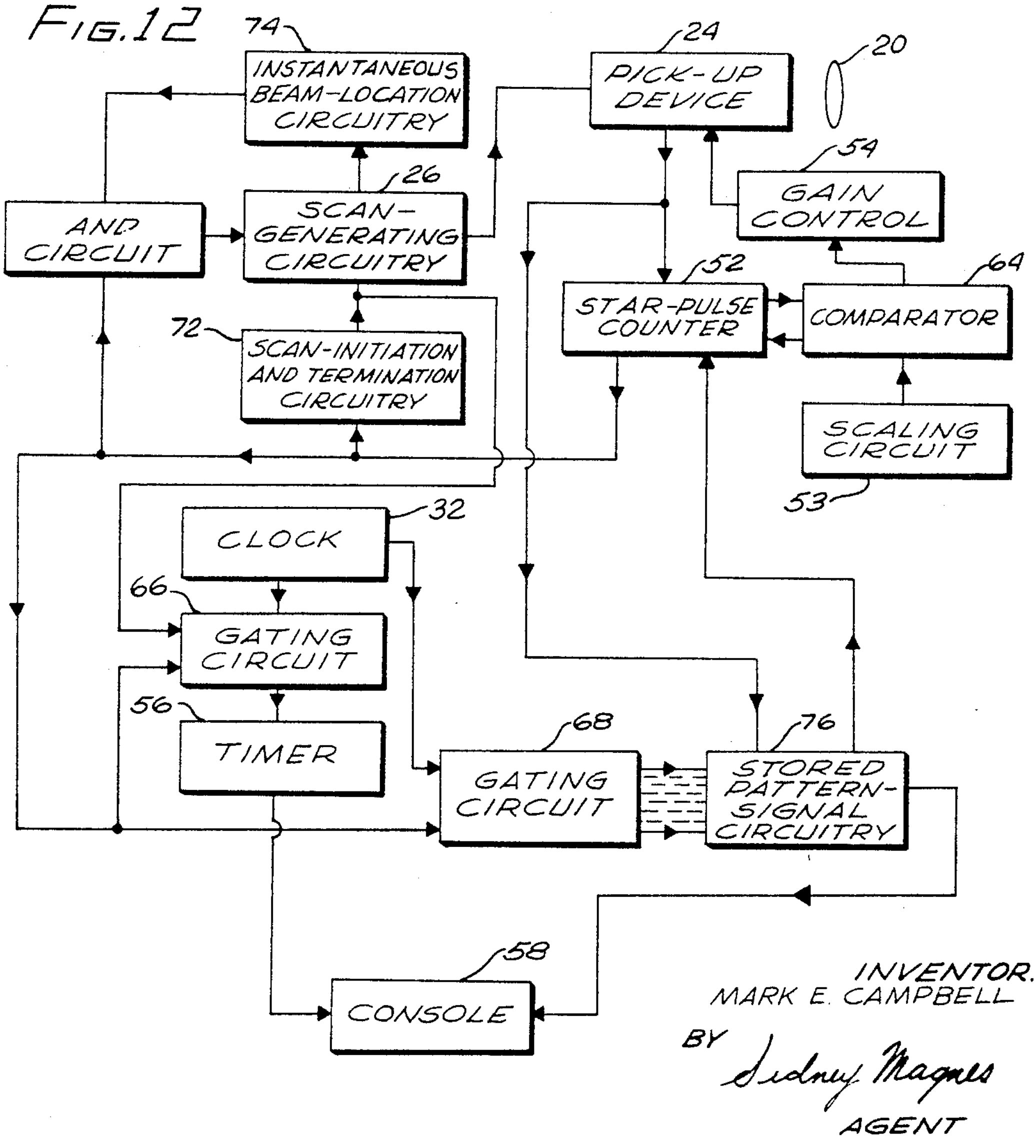
FIGURE 12 illustrates a simplified block diagram of the invention.

The operation of the disclosed invention may be understood from the simplified block diagram of FIGURE 12. Once the apparatus is energized, it first performs the previously described counting scan by causing scan-generating circuitry 26 to provide deflection voltages that are applied to pickup device 24 to produce a conversion scan. The output of pickup device 24, in the form of star-pulses, is applied to a star-pulse counter 52 that counts the star pulses produced during the conversion scan; and the number of star pulses is compared—in comparator 64—with the desired and predetermined number of star-pulses per scan, as stored in a scaling circuit 53. If the comparator 64 indicates that too many star-pulses are being received, its output is applied to a gain control circuit 54 that reduces the gain of pickup device 24. The gain control may adjust the minimum acceptable level of signals in device 24, or alternatively may adjust the optical sensitivity. Therefore, the next scan of pickup device 24 produces fewer star pulses; the total number of which are again compared with the number stored in scaling circuit 53. If the pickup device is still producing too many star-pulses, comparator 64 again reduces the gain of pickup device 24. In this way, subsequent scansions of pickup device 24 produce progressively fewer star-pulses until the count is in the desired 10-to-15 star-pulses range desired for each star-pattern, as stored in scaling circuit 53.

If it had so happened that pickup device 24 was picking up too small a number of star pulses for each scan, comparator 64 would have increased the gain of the pickup device 24; and subsequent scansions would have their gains increased until the pickup device produced a number in the desired and predetermined range of star pulses for each scansion.

When comparator 64 indicates that the desired number of star pulses are being received for each scansion, its output signal is applied to star-pulse counter 52.

At the next search-scansion, star-pulse counter 52 produces an output signal at the interception of the first star, this being the base-star previously discussed. Alternatively, during this complete scan, the deflection voltages corresponding to each star image may be stored in the computer memory to be used subsequently in biasing (shifting the starting point of the scan) to each of the star image positions in turn as each serves as the base-star for a succeeding trial of pattern matching.

Once the base-start is intercepted, the base-star pulse from pulse counter 52 is appled to the scan initiation and termination circuitry 72, which thereupon causes the scan generating circuitry 70 to terminate the search-scan, and to initiate a recognition-scan. Simultaneously, the base-star pulse from star pulse counter 53 is also applied to an AND circuit that permits the instantaneous beam location voltages to be applied from circuit 74 to the scan generating circuitry 26, the effect of this voltage being to shift the starting point of the recognition scan from the origin point to the base-star; all other points of the entire scan pattern being shifted correspondingly. Simultaneously, the base-star pulse from star pulse counter 52 is also applied to a gating circuit 68 that resets the recorded pattern-signal circuitry 76; and simultaneously applies the clock pulses to the pattern-signal circuitry 76. Simultaneously, timer 56 provides console 58 with an orientation-time interval signal, by accumulating the clock-pulses passing through the gating circuit 66 during the time interval starting with the signal from the scan-initiating circuit, and terminating with the star-pulse from the first star; this orientation-time signal being used to indicate the rotational orientation of the vehicle.

To recapitulate, the operation to this point is as follows. The apparatus has produced a series of counting scans that have adjusted the gain of the pickup device to produce the desired number of star pulses; a search scan has been performed to find a suitable base-star for the recognition-scan; a recognition-scan has been initiated using the base-star as the starting point; an orientation-time-interval signal has been produced; and the recorded pattern-signal circuitry has been activated to produce the recorded pattern-signals that are to be compared with the incoming signals from the pickup device.

The incoming signals from pickup device 24 are applied to the recorded pattern-signal circuitry 76, and if the incoming signals match one of the recorded pattern signals, the output is applied to console 58, to be displayed or used in any desired manner.

If, however, the incoming signals from pickup device 24 do not match any of the recorded pattern-signals, the following sequence is initiated. A signal from the recorded pattern-signal circuitry 76 is applied to star-pulse counter 52, which thereupon initiates another search-scan starting from the original origin-point; this search-scan differing from the first one in that the second rather than the first star-pulse is used to produce the shifting of the scan starting point, and the initiation of the recognition-scan. A second recognition-scan and pattern-signal comparison is now performed, and if it is satisfactory, a signal is applied to console 58; whereas if it is unsatisfactory, a signal is again applied to start pulse counter 52, which now initiates a shifting to a third base-star, and a recognition-scan using the third base-star as the scan starting-point.

In the interests of clarity of illustration, the circuitry and connections for various setting and resetting signals have been omitted, since these are well known to those skilled in the art.

If it is desired to calibrate or check the equipment, the computer may cause the apparatus to scan a picture or an electronically-produced standard star-pattern; and to adjust the gain and/or other controls to produce a satisfactory output.

It will be realized of course, that the pattern does not have to be a visual one, but may comprise an infrared pattern or the like. Also, while the foregoing discussion has been presented in terms of points, spots, and stars, the disclosed concept may be used to recognize the patterns formed by alphanumeric characters, isophote maps, etc.

Although the invention has been described and illustrated in detail, it is to be clearly understood that the same is by way of illustration and example only, and is not to be taken by way of limitation; the spirit and scope of this invention being limited only by the terms of the appended claims.

What is claimed is:

1. In a pattern-recognition system, the combination comprising:

means, comprising a pickup device, for converting a pattern into a pattern-signal having a series of time-sequence signals having, between said signals, individual time-intervals that have a time-relation that is characteristic of said pattern;

means for storing a plurality of pattern-signals, each stored pattern-signal having a series of time-sequence signals having, between said signals, individual time-intervals that have a time-relation that is characteristic of a related known pattern; and means for comparing said time-intervals of said converted pattern-signal with said time-intervals of said stored pattern-signals.

2. The combination of claim 1 including means for producing a conversion scan, means for starting said conversion scan at a selected point, means for detecting a given signal of said converted pattern-signal, means for shifting said starting point of said scan to a new starting point corresponding to the location on the pattern of a point causing said given signal, and means for causing said converting means to convert said pattern into a pattern-signal based upon said shifted starting point.

3. The combination of claim 2 including means for timing the interval between the initiation of said conversion scan and the detection of said given signal, said time-interval indicating the angular-orientation of said system.

4. In a star-pattern-recognition system for determining the attitude of a body by observation of groups of stars in the celestial sphere, and by the repetitive scanning of a field of view of the celestial sphere by means of conversion scans, said scans producing pattern-signals corresponding to the viewed groups of stars, the method comprising the steps of:

storing a plurality of pattern-signals of time-sequence signals having, between said signals, invariant time-intervals corresponding to known star-patterns;

producing a search-scan to search for and find a suitable base-star;

producing a recognition scan using said base-star as the starting point of said recognition scan; and comparing the time-sequence pattern-signal produced during said recognition scan with said stored time-sequence pattern-signals—whereby the viewed star-pattern may be recognized as one of the known star-patterns.

5. The method of claim 4 including the repetition of the recited steps until a pattern signal resulting from a recognition scan corresponds to a stored pattern, at which time the observed star pattern corresponds with a known star pattern.

6. The method of claim 4 including the step of timing the interval between the initiation of the recognition scan and reception of the signal from the base-star—whereby the roll-orientation of the body may be determined.

7. A star-pattern recognition system comprising:

a pickup device;

optical means for imaging a star-pattern on said pickup device;

scan-generator means for affecting a conversion scan, having circular symmetry, of the pattern imaged on the pickup device, said scan producing star-pulse output signals;

means, responsive to the star-pulse signals generated by the pickup device, for locating the star corresponding to the first star-pulse provided by said scan;

means, responsive to the locating means, for causing the scan-generator means to initiate another conversion scan starting from said located star;

a plurality of recognition channels, each including a storage device having therein—in the form of a time-sequence of pulses—a known star-pattern, an AND circuit having an input from the pickup device and a second input from the storage device, a totalizer counter having an input from the output of the AND circuit, a comparator having inputs from the totalizer counter and the coincidence counter, a switch between the storage device and the AND circuit for disabling the connection therebetween in response to lack of coincidence indicated by the comparator, and means for providing an indication of such lack of coincidence.

8. The combination of claim 7 including:

counter means, connected to the pickup device, for counting pulses received from said pickup device during a counting scan;

comparator means, connected to said counter means, for providing an indication of the magnitude and a sense of the difference between the number of star pulses counted and a predetermined number; and sensitivity control, responsive to the comparator, for adjusting the sensitivity of the pickup device to vary the number of stars to which the pickup device is responsive.

9. A method for recognizing an unidentified pattern in a field of view, comprising the steps of:

converting said unidentified pattern to an image;

initiating, from a first point, a first repetitively circumscribing scan of an area of said image;

sensing and locating a first intersection of said image by the first scan;

initiating, from said first intersection, a second repetitively circumscribing scan similar to the first scan;

producing from said second scan a pattern signal of successive intersections of the second scan with said image, said pattern signal starting with the first intersection of said second scan subsequent to initiation of the second scan; and comparing the pattern signal with a number of stored patterns for time-sequencing similarities.

References Cited

UNITED STATES PATENTS

| | | | |
|---|---|---|---|
| 3,120,578 | 2/1964 | Potter et al. | 250—203 X |
| 3,281,601 | 10/1966 | Sheftelman | 250—203 |
| 3,341,653 | 9/1967 | Kruse | 250—203 X |

JAMES W. LAWRENCE, *Primary Examiner.*

C. R. CAMPBELL, *Assistant Examiner.*

U.S. Cl. X.R.

250—236